United States Patent [19]

Lee

[11] 4,417,543
[45] Nov. 29, 1983

[54] APPARATUS FOR INDIVIDUALLY ENCAPSULATING MAGNETIC PARTICLES

[75] Inventor: Lawrence L. Lee, Fort Wayne, Ind.

[73] Assignee: Magnavox Government and Industrial Electronics Company, Fort Wayne, Ind.

[21] Appl. No.: 287,023

[22] Filed: Jul. 27, 1981

Related U.S. Application Data

[62] Division of Ser. No. 106,793, Dec. 26, 1979, Pat. No. 4,283,438.

[51] Int. Cl.³ ............................................... B05B 5/02
[52] U.S. Cl. .................................... 118/620; 118/417; 118/429; 118/612
[58] Field of Search .................. 427/47; 118/620, 612, 118/417, 429

[56] References Cited

U.S. PATENT DOCUMENTS 2,651,437  9/1953  Fields .................................... 141/24
4,024,295  5/1977  Chase et al. ........................... 427/47

FOREIGN PATENT DOCUMENTS 50-98066  8/1975  Japan .
761272  9/1980  U.S.S.R. .

Primary Examiner—Bernard D. Pianalto
Attorney, Agent, or Firm—Thomas A. Briody; William J. Streeter; Richard T. Seeger

[57] ABSTRACT

An apparatus for encapsulating magnetic particles by enclosure within oil drops, mixing in an aqueous solution and dispersing the oil drops with the enclosed particles by application of an alternating magnetic field. The dispersed and oil covered particles are microencapsulated with at least one type of polymer.

25 Claims, 6 Drawing Figures

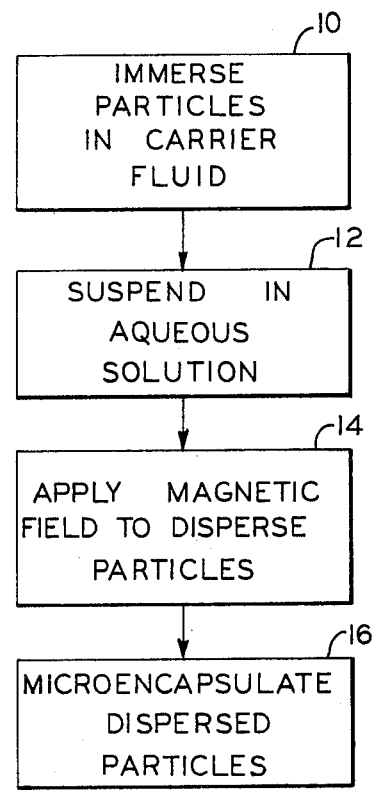
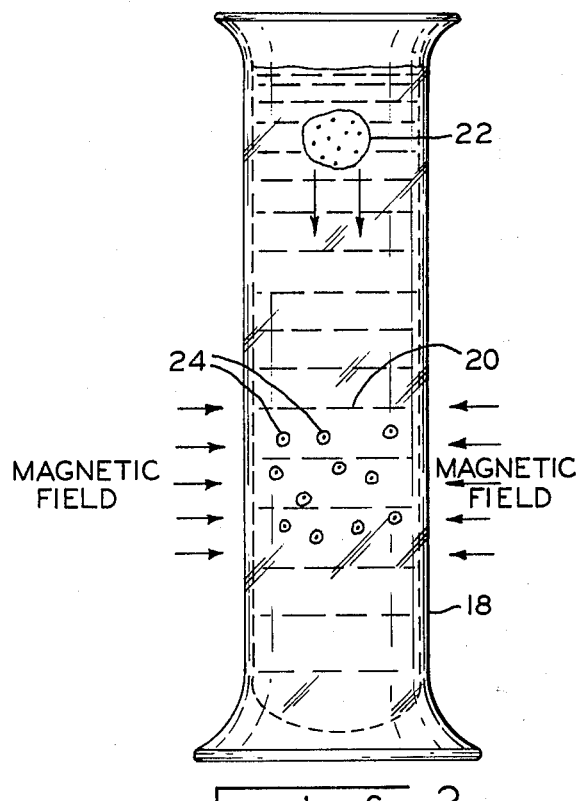
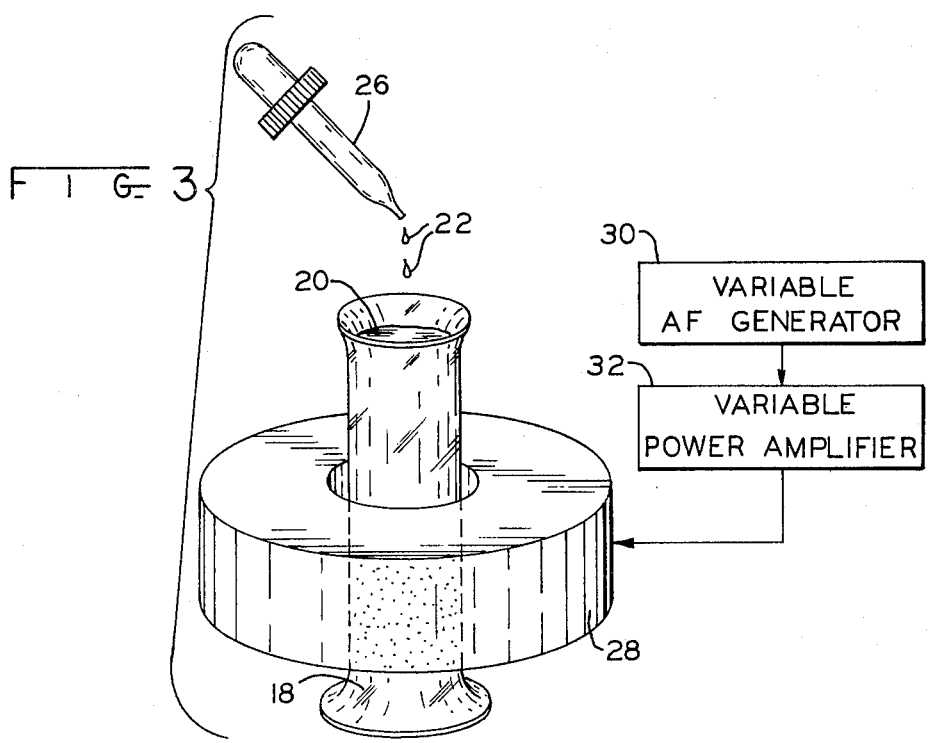

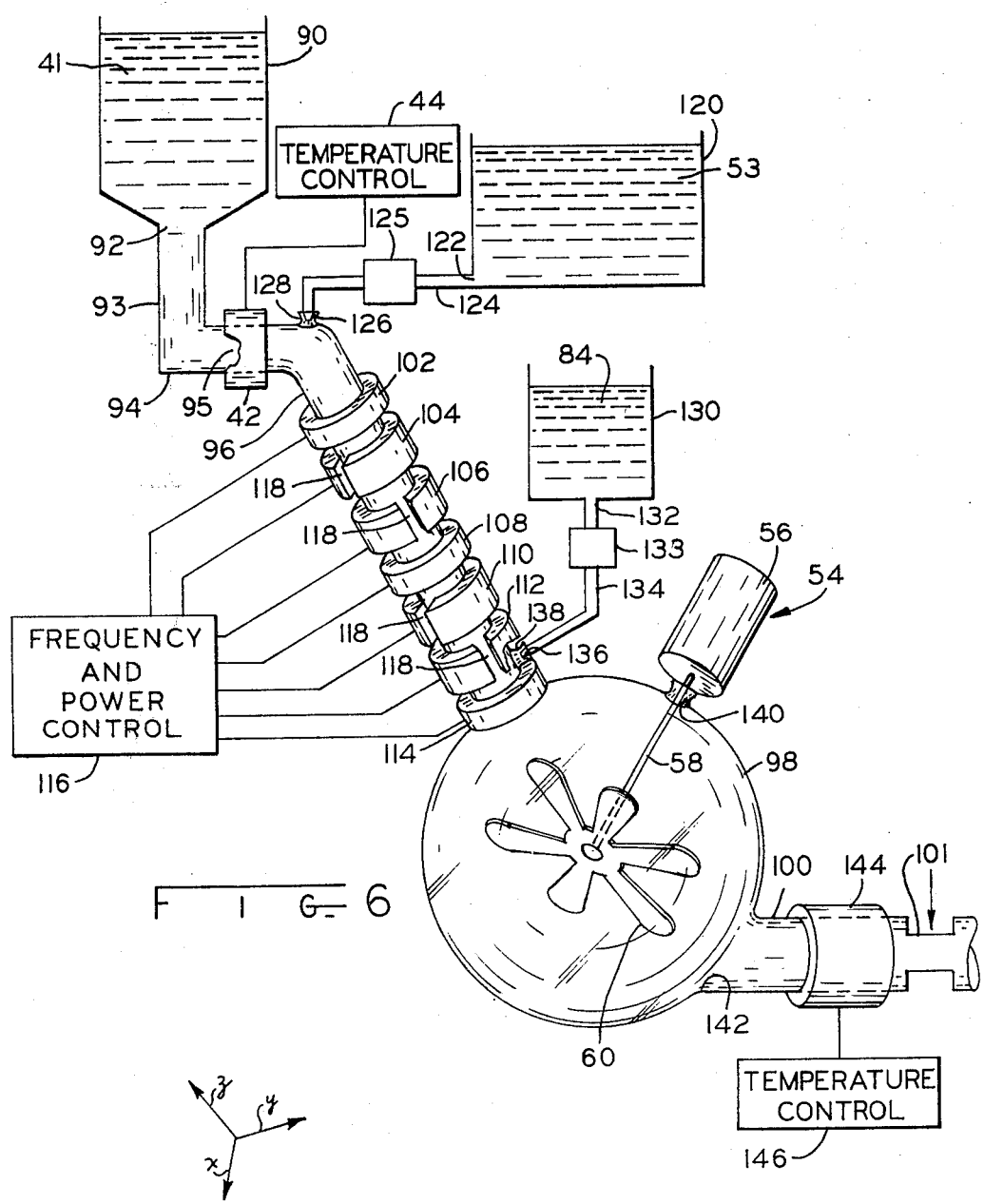

4,417,543

APPARATUS FOR INDIVIDUALLY ENCAPSULATING MAGNETIC PARTICLES

RELATED APPLICATION

This application is a division of of my copending application entitled "Method for Individually Encapsulating Magnetic Particles", Ser. No. 106,793, filed Dec. 26, 1979, now U.S. Pat. No. 4,283,438.

BACKGROUND OF THE INVENTION

This invention relates generally to magnetic particle displays and particularly to apparatus and a method for individually encapsulating magnetic particles for use in such displays. Magnetic particle displays are typically flat panel, matrix addressable display devices. The displays form images on a panel of freely rotating spherical particles, each of which is a tiny permanent magnet, dark colored in one hemisphere and light colored in the other. Thus, the amount of ambient light reflected by the particles is a function of the particle orientation which is controlled by a magnetic field. Since the magnetic particles are generally spherical as opposed to disk shaped, the particles do not need to be pivoted for rotation. It is then practical to use very small particles on the order of 1 millimeter (mm) or less in diameter or linear dimension and in very large numbers. The magnetic particles are typically smaller than can be resolved by the naked eye thus giving the display a high resolution.

Fabrication of a magnetic particle display requires combined efforts in four rather unrelated technological areas. First, one must make the spherical particle. Second, one must impart to these particles the desired optical and magnetic properties. Third, the particles must be encapsulated for positioning on the surface on which the image is to be produced; and finally, a magnetic field must be provided to control the orientation of the encapsulated particles. The method and apparatus of the present invention, are concerned with and are directed to the foregoing noted third step of fabrication wherein the particles are encapsulated for placement within the environment wherein the image is to be produced. More particularly, a method is needed to encapsulate individual ones of the extremely small particles within a carrier fluid medium for rotatable installation within the display. One of the more difficult problems involved in encapsulation is the dispersal of a large number of agglomerated magnetized spherical particles in such a manner that individual ones of the particles can be separately and uniquely placed within associated ones of the capsules. Since the particles are magnetized, they tend to attract each other due to the inherent magnetic forces and thus resist separation and dispersal for placement into individual capsules. Furthermore, surface tension of the surrounding liquid prevents the particles from being separated. In other words, the interfacial tension of the oil and water interface makes it difficult for larger oil drops to separate into smaller ones. The surface tension force can be characterized as a short range force that generally operates only when the particles are in very close proximity to each other and is a relatively strong force to overcome. Thus, when the particles are so close to each other that the surrounding oil forms a continuous volume, there is usually a relatively strong force to overcome. The magnetic force, in contrast, can be characterized as a long range force that tends to pull particles together from greater distances and is a relatively weak force, especially at large distances.

One method known in the prior art for providing dispersal of the agglomerated magnetized particles is the use of mechanical agitation devices which interact with and disperse the agglomerated particles when such particles are placed in a carrier fluid such as oil. In such a method, the degree to which the dispersal is accomplished largely depends on the intensity of the applied mechanical forces with the greater applied mechanical forces resulting in the greater dispersal but also with the concurrent possibility of removing all the oil surrounding the particles. The implementation of such a method requires a certain delicacy and sensitivity in impacting the particles with the agitating means so as to create a reasonable yield of oil covered useful particles.

SUMMARY OF THE INVENTION

Accordingly, it is an object of the present invention to provide an apparatus for dispersing individual ones of magnetized particles by magnetic means to insure that each of the particles is fully coated with carrier fluid. Another object of the invention is to provide an apparatus for dispersing individual ones of magnetic particles to produce a high yield of particles useful in a magnetic display. Yet another object of the invention is to provide an apparatus for encapsulating magnetic particles in order to permit rotation of individual particles within associated capsules. Still another object of the invention is to provide an apparatus for encapsulating individual ones of magnetic particles for increasing the encapsulated particles resistance to impacting external forces and to provide for easier handling and placement of the encapsulated particles in a display. Another object of this invention is to combine with the magnetic means a mechanical stirring to accomplish dispersion of the particles and final smoothing of the particle shell. It is an object of this invention to control the conditions of the fluid in which the particles are dispersed, e.g. fluid temperature, pH, and concentrations, such that the capsule shell can be formed at precisely the moment oil drops, in which the particles are contained, are properly dispersed. A further object of this invention is to provide apparatus for continuously flowing suspended magnetic particles through a conduit and magnetically dispersing the particles while flowing.

Briefly, these and other objects are accomplished by an apparatus for encapsulating magnetic particles by immersion in oil drops, mixing the oil drops in an aqueous solution and causing individual ones of the agglomerated particles within the aqueous oil solution to individually disperse by application of an alternating magnetic field. The individually dispersed particles, still under the influence of the magnetic field, are microencapsulated with at least one type of polymer by means of the addition of a polymer forming material to the oil water suspension to form a relatively hard, or solid, shell enclosing the magnetized particle within the oil. Once coated with a solid capsule wall, the effects of surface tension, or tension of the two liquid interface, are removed, and the particles are relatively easy to separate again, even if they have been allowed to agglomerate. The shell may be coated by additional polymer which provides a yet thicker capsule wall about the enclosed particle and which capsule is easily handled for placement within the magnetic display.

In a second embodiment, mechanical agitation, in the form of stirring, of the aqueous solution in which the oil drops are suspended is employed, in addition to the varying magnetic field, to assist in the dispersion of the encapsulated particles and to keep in dispersion the nonmagnetic materials such as the encapsulated oil drops without particles and excessive shell materials. Also, control of temperature, pH, and/or concentrations of an aqueous shell forming solution is provided, prior to the immersion and suspension of the oil drops therein, the conditions being such that shell starts to become formed only when the particles are properly dipersed. Also, in the case of microencapsulation by gelatin coacervation, the solution is quenched after formation of the capsule wall, to prevent adhesion of the capsules.

In a further embodiment, the suspended drops are flowed through a tube and a varying magnetic field of increasing frequency is applied to the tube interior, the frequency increasing from upstream to downstream portions of the tube to provide a continuous process of encapsulation. Therefore, the particles will be carried through regions of lower magnetic field frequencies to regions of higher magnetic field frequency, the effects on dispersion being the same as if the particles were contained in a stationary beaker and magnetic fields of increasing frequencies applied.

For a better understanding of these and other aspects of the invention, reference may be made to the following detailed description taken in conjunction with the accompanying drawings.

BRIEF DESCRIPTION OF THE DRAWINGS

FIG. 1 is a block diagram of the sequential steps of the method according to the present invention;

FIG. 2 is a side elevation view of a container illustrating the dispersal of magnetic particles while under the influence of a magnetic field according to the invention;

FIG. 3 is a simplified illustration and block diagram of apparatus for dispersing the particles according to the method of the present invention;

FIG. 6 is a simplified perspective partially sectioned, partially broken away, partially block diagram view of a further embodiment of this invention; and FIG. 6A is a field vector diagram for the coils of FIG. 6.

DESCRIPTION OF THE PREFERRED EMBODIMENT

Figure 4:
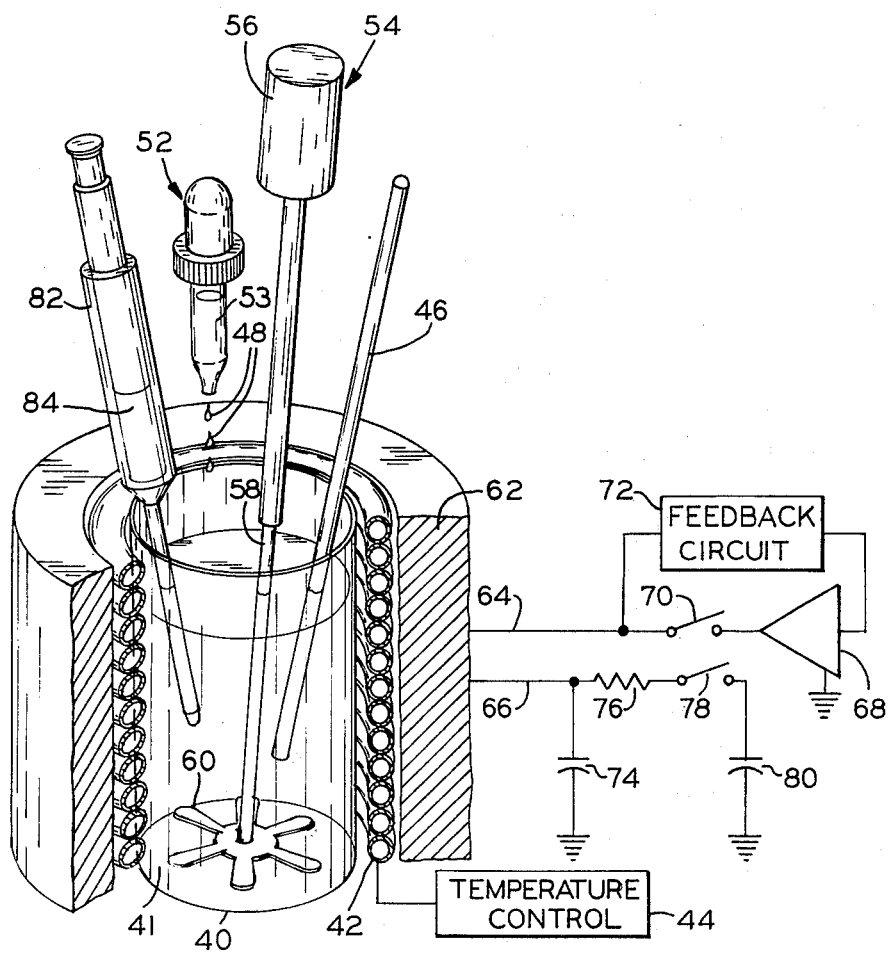
FIG. 4 is a simplified perspective broken away partially schematic view of another embodiment of this invention.

According to the instant invention, a method is provided for dispersing oil covered magnetic particles in an aqueous medium such that each of the individually enclosed, or oil surrounded, magnetic particles is microencapsulated in a transparent solid shell that permits relatively easy handling for placement in a magnetic particle display.

Referring now to FIG. 1 there is shown a block diagram of the steps used in the encapsulation method of the present invention. The method is useful with a variety of differing magnetic particle types and, in the preferred method of the present invention, the particles used were of a strontium ferrite material enclosed in a polyethylene binder forming a spherical particle approximately 200 μm in diameter. The magnetic coercive force of the strontium ferrite is approximately 2000 oersted. The particles are preferably colored and encapsulated in a transparent shell for use in a magnetic particle display. Typically, one hemisphere of the particle is colored with a dark color and the remaining hemisphere of the particle is colored with a contrasting color. Various methods of manufacture of the particles and the coloring thereof are known in the art and the details thereof are not discussed herein. Block 10 of the diagram illustrates the first step of the method wherein the magnetized particles are first immersed in a carrier fluid such as oil or other oily fluids such as hydrocarbons, fluorocarbons, polysiloxanes, or esters. The purpose of the oil is to provide a fluid which surrounds the particle and permits rotation of the particle under the influence of a magnetic field. The oil which surrounds the particle is sometimes referred to in the art of microencapsulation, as the "internal phase". This is in contrast to another fluid medium in which the oil drop will be suspended and which is referred to as the "continuous phase." The oil is generally one of many transparent liquids that are not miscible with water, and, in a preferred method, a silicone oil having a viscosity of 5 centistokes (cst.) is used.

Once immersed in the oil, the particles are then suspended in the continuous phase which, in most cases, is an aqueous solution as shown in the second step of the method as noted in block 12. The aqueous solution in this embodiment is a mixture of water and an additional appropriate amount of surfactant which is used to reduce interfacial tension. The surfactant in a preferred method is L77 surfactant available from Union Carbide Chemicals, New York, and it is applied at a concentration of 0.03% in water. The immersed particles are transferred to the water solution with an eye dropper or pipette and dropped into the water. These drops are generally a few millimeters in diameter and may agglomerate into larger drops.

The suspended drops within the water solution are then exposed to a magnetic field as noted in the third step of the method in block 14. An alternating magnetic field having an amplitude of approximately 300 oersted, or gauss, is preferably used at a frequency of approximastely 150 Hertz (Hz). This frequency has been found sufficient for the initial dispersion in the case of the aforementioned materials. For higher viscosity oils, such as paraffin oil, the desired frequency is lower, such as, for example, 50 Hz. After the applied magnetic field has caused the larger drops to break up into smaller ones, the frequency may be increased and the process repeated, causing the drops to become smaller after each change of frequency. The frequency may be increased in discrete steps, in which case each step should represent a frequency increase of not more than 50% in order to maintain stability within the dispersal process. Moreover, in the case of discrete frequency changes, the applied magnetic field should be maintained at each frequency for at least two hundred cycles before being switched to a higher frequency. Gradual increase of the frequency is necessary for dispersion of the oil drops because at each respectively differing frequency, only oil drops of a particular size range will disperse into smaller drops. For example, at 600 Hz frequency, drops of 5 cst. silicone oil of approximately 2 mm diameter containing hundreds of magnetic particles will not disperse. For silicone oils having a viscosity of 5 cst. a frequency of approximately 800 Hz will typically be reached before the drops become so small that most all of the drops contain but one magnetic particle. Alternatively, the magnetic field dispersal process may be varied to control the size of the drops such that any desired average number of particles are enclosed therein. After dispersal by the magnetic field to the point where the desired average number of particles are contained within each drop, the microencapsulation step of the method may begin as noted in the fourth step of block 16 in the diagram. During the encapsulation process, the magnetic field is maintained at the highest frequency last used to disperse the drops in order to maintain the drops in a dispersed relationship during the microencapsulation process. The microencapsulation step is begun by application of a polymer coating on the drop surface between the oil and the water. In the preferred method, acid chlorides are first added to the oil to form the internal phase. The internal phase consists of a saturated solution of sebacoyl chloride, azelaoyl chloride, and trimesoyl chloride in silicone oil. After the magnetic particles contained within the internal phase have been sufficiently dispersed and are ready to be microencapsulated, a sufficient quantity of diethylenetriamine is added to the aqueous solution to reach a final concentration of approximately 5%, and as low as 0.5%, with the result that an interfacial film of polyamide is thus rapidly formed. The polyamide polymer coating is formed due to the interfacial reaction between the amine in the water and the acid chlorides in the oil. The interfacial reaction is accomplished, or solid film is formed, in less than a second. The resultant polymer coating, although encapsulating the entrapped particle within the oil carrier fluid, is usually relatively thin and at this point may not withstand the rough handling encountered in further processing. Accordingly, it may be necessary to optionally build up and increase the thickness and strength of the capsule by the application of an additional coating in the microencapsulization step of the method.

Various microencapsulation techniques are known in the art and are disclosed, for example, in the text "Microcapsules and Microencapsulation Techniques" by M. Gutcho, Noyes Data Corporation, Park Ridge, N.J. (1976). During the latter optional portion of the microencapsulation step, the magnetic field force may be substantially reduced inasmuch as dispersion may be more easily maintained due to the previously applied polymer coating which enables redispersion of the agglomeration of the enclosed particles.

Once microencapsulated, the magnetic particles are entrapped in transparent shells having at least one polymer coating. The capsules are sufficiently strong so as to withstand normal handling for placement into a magnetic particle display. The placement of the particles in the display may be done in any well known fashion such as by adhesion onto a substrate.

FIG. 2 illustrates a side view of a container 18 such as a glass beaker which is used to hold the aqueous solution 20. More clearly illustrated is a particular one of the oil immersed drops 22 having a number of particles enclosed therein. As the drop 22 gravitates downward within the container 18 and comes within the influence of a magnetic field shown applied about the container, the single drop 22 disperses into a plurality of smaller drops 24 each having enclosed therein a single particle. The particles are suspended in the solution and exhibit apparently random motion due to the influence of the applied magnetic field.

FIG. 3 illustrates the apparatus used in the dispersal and encapsulation process of a preferred method. An eye dropper 26 having a quantity of oil immersed particles therein is activated to cause a number of the immersed particles to form into the drops 22 which are dropped into the container 18. The container is used to hold the aqueous solution noted hereinbefore in the operation of the preferred method during dispersal and microencapsulation. As also noted hereinbefore, a selected amount of surfactant is added to the water in combination with the oil drops containing the enclosed particles. An alternating magnetic field is applied to the aqueous solution by a means of a field coil 28 driven by a variable audio frequency (AF) generator 30 whose output is coupled to a variable power amplifier 32 whose output drives the coil. The field intensity and frequency are conveniently varied for purposes of implementation of the inventive methods by conventional means in adjusting the generator 30 and the amplifier 32.

Although the dropper means have been illustrated as an eye dropper 26, it will be appreciated that alternate means such as a pipette, spatula, or a spoon may be utilized in the method of the present invention to achieve economies of scale in production and efficiency.

Referring to FIG. 4, container 40, in this embodiment a 150 ml glass beaker, contains a continuous phase mixture 41 of 60 grams of 2% solution of 290 Bloom, pigskin gelatin and 0.15 cc of 40% sodium hexameta phosphate. The mixture is initially at an elevated temperature, e.g. in a range of 50° C. to 55° C., and is cooled by natural convection of ambient air, with the help, if necessary, of temperature control coil jacket 42, which is wrapped around container 40, at a rate of 0.8° C. per minute to a temperature of 41° C. Temperature control 44 is manually or automatically adjustable to control the cooling rate provided by jacket 42, the provides the coils in jacket 42 with a coolant fluid in a manner well known in the art. Thermometer 46 is used to monitor the mixture temperature and is removed after the temperature of 41° C. is reached.

Figure 5:
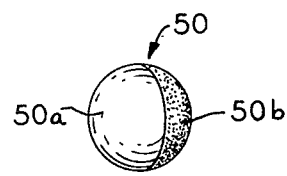
FIG. 5 is a greatly enlarged perspective view of a magnetic particle.

Drop 48 is of an internal phase oil mixture 53 containing magnetic particles 50, each drop 48 containing in the order of 500 particles. Six drops 48 are dropped into mixture 41 as by an eyedropper 52, or other drop forming member, after mixture 41 has reached a temperature of 41° C. The oil mixture 53 is a mixture of, by weight, 4 parts paraffin oil and 1 part kerosene, with 5% Trimesoyl Chloride and 4% Alrosperse 100, a surfactant manufactured by the Ciba-Geigy Corporation, Dye and Chemical Division, 1410 Swing Road, Greensboro, N.C. 27407, by weight, added to the mixture of paraffin oil and kerosene. The particles 50 are 120 $\mu$m diameter spheres of a polyethylene and ferrite magnetic material, silver coated on one hemisphere 50a, FIG. 5, and dark colored on the other hemisphere 50b, and are magnetized to saturation, and have been pre-soaked for several hours in the oil mixture 53.

A stirrer 54 has a motor 56 which turns shaft 58 at approximately 1000 rpm. A six blade turbine 60 is affixed to the end of shaft 58 and the diameter of turbine 60 is preferably greater than 70% of the diameter of container 40. Shaft 58 and turbine 60 are of a nonmagnetic dielectric material such as glass.

A field coil 62 having electrical leads 64, 66 is placed about jacket 42 and container 40 and is coupled through lead 64 to power amplifier 68 through on-off switch 70. Feedback circuit 72 is placed across the input and output of amplifier 68. Capacitance 74 is coupled between lead 66 and ground. Resistance 76 is coupled to lead 66 and, through switch 78 and capacitance 80, to ground. Switches 70, 78 may be of solid state construction, with appropriate well known circuitry for their operation. Thus connected, amplifier 68 acts as an oscillator, having a first oscillatory or resonant frequency of 430 Hz and first power output to coil 62 to provide a magnetic field strength of 400 gauss in container 40, when switch 70 is closed and switch 78 is open. With switches 70, 78 closed, a second oscillatory or resonant frequency of less than 100 Hz and a second power output to coil 62 to provide a magnetic field of less than 100 gauss in container 40, are provided. The circuit components to obtain these frequencies and fields are as follows: audio amplifier 68, 750 watts; coil 62, 60 mh, coil resistance 5 ohms; resistance 76, 5 ohms; capacitance 74, 2.3 $\mu f.$; capacitance 80, 20 $\mu f.$ After stirrer 54 has been operated for a brief period, e.g. a second, switch 70 is closed, switch 78 being open, to provide a magnetic field having a frequency of 430 Hz and a field strength of 400 gauss in container 40 for about one second to disperse particles 50, drops 48 becoming smaller, and particles per drop becoming fewer, viz. one particle per drop. Then 0.6 cc of 20% acetic acid solution 84 is injected into container 40, using syringe 82 or other volumetrically accurate fluid dispenser, changing the pH of the mixture in container 40 from approximately 5 to 4. This change results in the formation of two phases, phase one being a dilute solution of gelatin in water, and phase two being a coacervation which contains a much higher concentration of gelatin than phase one. The coacervate gathers on the surface of the oil drops and forms the shell of the capsules.

Switch 78 is then closed to connect resistance 76 and capacitance 80 in the amplifier 68 circuit, reducing the magnetic field frequency to less than 100 Hz, and the field strength to less than 100 gauss. At this point, the capsule walls are initially rough, but become smooth after about 1½ minutes of stirring by turbine 60 in combination with the weaker magnetic field. The turbine 60 is operated continuously from its start point in the cycle.

The required power and frequency of the magnetic field to obtain dispersion depends upon several factors. If particle 50 sizes are larger, the required power and frequency to field coil 62 are decreased; if interfacial tension between the oil mixture and the water in the continuous phase mixture is increased, the required power is increased, while the required frequency is unchanged; if viscosities of the internal and continuous phases are increased, the required power is increased and the required frequency is decreased; if particle magnetic intensity in increased, the required power may be decreased and the required frequency is unchanged. The magnetic field can have a dc component, as well as an ac component, and the dc component can be generated by a permanent magnet.

The previously described embodiments are batch type embodiments wherein the microencapsulation takes place in situ. To provide a uniform magnetic field throughout the batch, as the batch size is increased, the field power required is also increased. In the next described embodiment of this invention, the power requirements are minimized since only a relatively small field area is required for a relatively high rate of encapsulated particle output.

Referring to FIG. 6, continuous phase reservoir 90, which is maintained with a continuous phase of a mixture 41 having a composition as in the previous embodiment, has outlet 92 which feeds horizontal pipe section 94 through pipe section 93. Diagonal elongated tube 96 connects section 94 and spherical chamber 98, which is provided with outlet 100 having manually or automatically adjustable valve 101 to control the flow volume in outlet 100, and, as will be understood by those in the art, in tube 96. Section 94 is provided with temperature regulating coil jacket 42 wrapped around portion 95 of section 94, and temperature control 44 is coupled to jacket 42 to control the continuous phase temperature in the manner of the FIG. 4 embodiment, reducing the temperature from an initial range of about 50° C. to 55° C., which is mixture 41 temperature as it enters portion 95, at a rate of 0.8° C. per minute as the mixture flows through a portion 95 to a temperature of 41° C. as the mixture leaves portion 95.

Field coils 102, 104, 106, 108, 110, 112, 114 are longitudinally spaced along, from upstream to downstream, respectively, and are formed around tube 96, each providing a varying magnetic field uniformly across the tube 96 section encircled by the respective coil, according to the power and frequency supplied to each coil by Frequency and Power Control circuit 116, to which each coil is separately coupled. In this embodiment, the frequency of each coil increases by a factor of preferably less than twice the next previous upstream coil, coil 114 having the final frequency in the range of 1 kHz in this embodiment, and the field strength provided in tube 96 by each coil being as high as possible without demagnatizing the particles 50, and in this embodiment being in the 1.0 kgauss range, for the mixtures 41, 53 compositions of the embodiment of FIG. 4, which compositions are also used for the embodiment of FIG. 6.

Coils 102, 108, 114 are wound to provide an axial magnetic field in tube 96 in the z direction, FIG. 6A; coils 104, 110 are wound to provide a magnetic field in tube 96 in the y direction, FIG. 6A, which is perpendicular to the z direction; and coils 106, 112 are wound to provide a magnetic field in tube 96 in the x direction, FIG. 6A, which is perpendicular to both the z and y directions. Circumferential coil gaps 118 are placed in coils 104, 106, 110, 112, and are circumferentially positioned to obtain the aforementioned field directions. In this way, mutual inductance between adjacent coils is minimized, reducing the problem of driving these coils electronically.

Internal phase mixture reservoir 120 is maintained with an internal phase mixture 53 composition of the FIG. 4 embodiment, and has outlet 122 feeding pipe 124, in which is placed adjustable flow rate metering pump 125, and which has adjustable drop rate drop forming nozzle 126 at its end, the drop rate being controllable by the flow rate in pump 125, and being selected according to the flow rate in tube 96 to obtain the desired concentration. Valve 101 in outlet 100 is manually or automatically adjustable to control the flow rate in tube 96. Port 128 in tube 96 downstream of portion 95 receives, in fluid tight relation, nozzle 126 from which oil drops 48 containing particles 50 are admitted into tube 96, which drops are continuously dispersed into smaller drops containing fewer particles by the varying magnetic fields of coils 102–114, until only one particle per drop is obtained, at which point the drops enter chamber 98.

Acetic acid reservoir 130 is maintained with a supply of acetic acid solution 84 having the composition of the FIG. 4 embodiment solution, and has outlet 132 feeding into pipe 96 through adjustable flow rate metering pump 133 which is placed in pipe 134, which has an adjustable nozzle 136 at its end, the adjustments of pump 133 and nozzle 136 controlling the flow of acetic acid solution into port 138 which receives, in fluid tight relation, nozzle 136 and is formed in the wall of tube 96 between coils 112, 114, or further upstream in tube 96, so that the acid will be well mixed with the rest of the continuous phase solution by the time the mixture reaches coil 114. The flow rate of acetic acid through nozzle 136 may also be controlled by reservoir 130 pressure, the acetic acid flow rate being adjusted according to the flow rate in outlet 100. As in the embodiment of FIG. 4, the addition of the acid solution results in coacervation, the coacervate coating the particle containing oil drops.

The shell walls thus formed become smoothed as they pass slowly through chamber 98. Stirrer turbine 60 is driven by motor 56 through driveshaft 58 maintaining the capsules separated while the capsule or shell walls become smooth. Thus, reagglomeration is prevented by the turbine 60. Motor 56 is mounted exteriorly of chamber 98 and shaft 58 extends in fluid tight relation through opening 140 in the wall of chamber 98, and rotates at about 1000 rpm. Driveshaft 58 and turbine 60 are of a nonmagnetic dielectric material such as glass. Cooling jacket 144 is placed around outlet 100 and is coupled to Temperature Control 146, which provides jacket 144 with cooling fluid to bring the temperature in outlet 100 to about 10° C. causing the coacervate to become a solid gel. The encapsulated particles exit chamber 98 through chamber port 142 into outlet 100, where they are cooled and piped to the next step in preparing them for their ultimate use.

Thus an embodiment is provided having relatively small coils and correspondingly lower power requirements to provide a high volume rate of encapsulated particle output. Power requirements can be further reduced by utilizing ferromagnetic cores in the coils 102–114.

Thus there may be seen that there has been provided a novel apparatus and method for dispersing and encapsulating magnetic particles to insure placement of a desired average number of particles within an associated capsule.

Obviously, many modifications and variations of the invention are possible in light of the above teachings. It is therefore to be understood that within the scope of the appended claims the invention may be practiced otherwise than as specifically described.

What is claimed is:

1. Apparatus for dispersing a preselected average number of magnetic particles in discrete amounts of liquid internal phase and microencapsulating said amounts, comprising:
    first means for forming drops of liquid internal phase having a relatively large number of the magnetic particles immersed substantially in each drop of said drops;
    second means for receiving said drops; said second means adapted to confine a liquid continuous phase having a consistency to suspend said drops;
    third means operatively associated with said second means for dispersing said particles and forming successively smaller drops with corresponding successively reduced number of particles in each said smaller drop; said third means comprising means for applying a varying magnetic field to said second means, the frequency of said field variations being selected according to the desired number of particles in said smaller drops, the characteristics of the particles and the internal and continuous phases.

2. The apparatus of claim 1 wherein said third means comprises agitating means for physically agitating said internal and continuous phases to obtain smaller drops, each drop having a reduced number of particles therein.

3. The apparatus of claim 2 wherein said agitating means comprises a stirrer for physically stirring said internal and continuous phases.

4. The apparatus of claim 1 comprising fourth means for injecting encapsulation compositions into said continuous phase after said smaller drops have been formed to provide encapsulation of said smaller drops.

5. The apparatus of claim 1 wherein said third means further comprises means for varying the intensity and frequency of said magnetic field.

6. The apparatus of claim 1 wherein said third means is for progressively increasing the frequency of said field variations with respect to time to progressively disperse said particles and progressively reduce the number of particles in individual drops.

7. The apparatus of claim 6 wherein said number of particles in each drop is reduced to one.

8. The apparatus of claim 1 wherein said third means is for increasing the frequency of said field variations with respect to time in discrete steps, each step being of an increased frequency over the frequency of the next previous step.

9. The apparatus of claim 8 wherein said third means increases the frequency of said field variations an amount less than 50% of the frequency of the nex previous step, and there is a period corresponding to at least 200 cycles of said varying magnetic field between successive increases.

10. The apparatus of claim 1 wherein said third means applies a varying magnetic field of alternating magnetic polarity.

11. The apparatus of claim 1 wherein said second means comprises a container;
    said third means comprises a coil placed about said container;
    fourth means coupled to said coil for applying variable electrical power of variable frequency to said coil.

12. The apparatus of claim 11 wherein said third means comprises first and second resonating circuits for controlling the frequency of said magnetic field variations;
    said first circuit having a higher resonating frequency than said second resonating circuit;
    switch means for switching between said first and second resonating circuits.

13. The apparatus of claim 11 comprising:
    fifth means for mechanically agitating the liquids in said container, for initial dispersing of said particles into smaller drops, each drop after said initial dispersing having a lesser number of magnetic particles therein.

14. The apparatus of claim 13 wherein said fifth means comprises a rotatable turbine having a shaft mounted for rotation in a wall of said chamber;
    a motor mounted exteriorly of said container and mechanically coupled to said shaft for rotating said shaft.

15. The apparatus of claim 1 wherein said second means comprises an elongated tubular member having an upstream end and a downstream end for carrying liquid from said upstream end to said downstream end;

said tubular member having a first section and a plurality of sequential longitudinally spaced transverse sections downstream of said first section;

said third means for applying varying magnetic fields in said member in each of said sections.

16. The apparatus of claim 15 wherein said third means comprises a series of coils longitudinally spaced along and about said tubular member;

fourth means for applying a varying electrical power to each of said coils to provide a varying magnetic field within said coils and said tubular member.

17. The apparatus of claim 16 including an encapsulation chamber at the downstream end of said tubular member;

fifth means for injecting encapsulation compsitions into said tube upstream of the lost downstream coil;

sixth means for outflow of encapsulated particles that are formed in said chamber.

18. The apparatus of claim 17 including seventh means for mechanically agitating the liquids in said chamber, to keep the capsules separated while the capsule shell walls become smooth.

19. The apparatus of claim 18 wherein said seventh means comprises a rotatable turbine driven by a shaft rotatably mounted in a wall of said chamber;

a motor mounted exteriorly of said chamber and mechanically coupled to said shaft for rotating said shaft.

20. The apparatus of claim 17 having ninth means for cooling the liquid in said sixth means.

21. The apparatus of claim 15 wherein said third means is for applying a different frequency magnetic field in each of said sections;

said fields in said sections being of progressively higher frequency as section position changes from said upstream end to said downstream end, each downstream section having a higher frequency than the next previous upstream section, the frequency in said first section depending on the particle size, interfacial tension between the internal phase and continuous phase mixtures, the viscosity of said mixtures, and the magnetic intensity of the particles.

22. The apparatus of claim 21 wherein the frequency in each downstream section is less than twice greater than the frequency in the next previous upstream section.

23. The apparatus of claim 21 wherein said third means applies a plurality of field directions in said tubular member, the fields in adjacent sections being in different directions to minimize mutual inductance between adjacent sections.

24. The apparatus of claim 15 wherein said first means comprises a drop former positioned upstream of said first section for introducing particle containing drops into said member;

eighth means for supplying a continuous phase liquid mixture flow through said tubular member.

25. The apparatus of claim 1 including fourth means for lowering the temperature of the contents of said second means.

* * * * *

UNITED STATES PATENT AND TRADEMARK OFFICE
CERTIFICATE OF CORRECTION

PATENT NO. : 4,417,543

DATED : November 29, 1983

INVENTOR(S) : Lawrence L. Lee

It is certified that error appears in the above—identified patent and that said Letters Patent is hereby corrected as shown below:

Col. 4, l. 1 for "preferrably" read --preferably--;
Col. 5, l. 38 for "microencapsulization" read --microencapsulation--;
Col. 8, ll. 29, 30 for "demagnatizing" read --demagnetizing--;
Col. 9, l. 41 delete "and method";
Col. 10, l. 52 after "than" insert --the resonating frequency of--;
Col. 11, l. 18 for "lost" read --lant--.

Signed and Sealed this

Sixth Day of March 1984

[SEAL]

Attest:

GERALD J. MOSSINGHOFF

Attesting Officer

Commissioner of Patents and Trademarks